Aug. 30, 1932.   M. H. MARTINDELL   1,875,071
MOLD WITH EJECTOR
Filed March 14, 1929

Inventor
Milton H. Martindell
Kwis Hudson & Kent
Attys

Patented Aug. 30, 1932

1,875,071

UNITED STATES PATENT OFFICE

MILTON H. MARTINDELL, OF TRENTON, NEW JERSEY, ASSIGNOR TO JOSEPH STOKES RUBBER COMPANY, OF TRENTON, NEW JERSEY, A CORPORATION OF NEW JERSEY

MOLD WITH EJECTOR

Application filed March 14, 1929. Serial No. 346,887.

This invention relates to a method and means for molding articles in a permanent mold.

Heretofore, in the molding of float balls of rubber or the like, the threaded cores employed for the purpose of producing threaded sockets in the float balls have been formed on pins which were set into bored openings extending into the mold piece from the cavity thereof. When a ball was removed from the mold the core came with it. The core was then unscrewed from the finished ball and replaced in the mold for the next molding operation. In the removal and replacement of these core pins the edge of the mold around the pin opening was apt to be nicked or damaged, thereby marring the product of the mold thereafter.

One of the objects of the present invention therefore is the provision of a method and means which avoids such damage to the mold.

Another object is the provision of a method and means which permits the retention of the core pins in the mold at all times.

A further object is the utilizing of the operation of disconnecting the core pin and ball as a means for dislodging the ball from the mold.

Other objects and features of novelty will appear as I proceed with the description of that embodiment of the invention which, for the purposes of the present application, I have illustrated in the accompanying drawing, in which—

Figure 1:
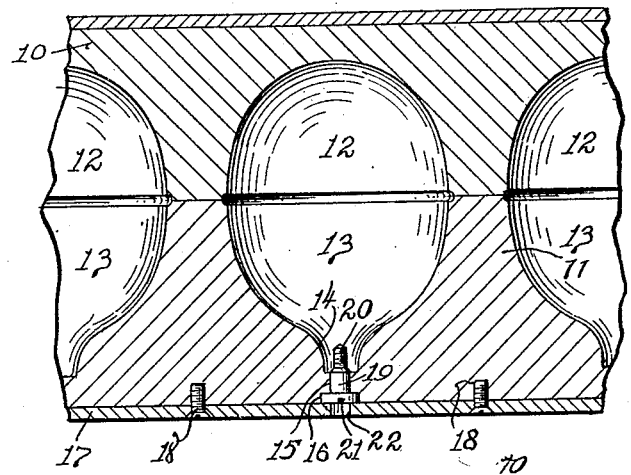
Fig. 1 is a fragmental sectional view of a multiple cavity mold embodying my invention.

In the drawing I have illustrated fragments of two mold pieces 10 and 11 containing a plurality of cavities 12 and 13, respectively, of the desired forms, these cavities being preferably formed with quarter round grooves at their peripheries in order to produce half round beads on the molded articles at the parting line. The mold pieces 10 and 11 are adapted to be brought into proper alignment when the mold is closed by means of the usual dowel pins and to be secured firmly together by any suitable clamping means.

The cavities 13 are formed at their lower ends with the customary necks 14 for the production of reinforcing bosses on the molded balls, in which bosses are located the threaded sockets by means of which connection is made with rods forming part of the mechanism to which the balls are connected in use.

In the mold piece 11, in alignment with the necks 14, cylindrical openings 15 connect the cavities 13 with the outer side of the mold piece. These openings are counterbored at 16. 17 is a cover plate which is removably secured to the mold piece 11 by screws 18 or the like. Before the plate 17 is put in place, however, headed pins 19 are inserted in the openings and counterbores 15 and 16. These pins have threaded portions 20 extending into the cavities 13 through the centers of the necks 14, constituting the threaded cores. The pins 19 are maintained in position and prevented from having longitudinal movement by the cover plates 17, which overlie the heads of the pins. These heads may be provided with slots 21 for the reception of a screw-driver, holes 22 of smaller diameter than the heads being bored in the plate 17 in alignment with the openings 15, in order that the screw-driver may be inserted.

In carrying out the invention cup-shaped pieces of rubber are placed in the cavities 12 and 13, the rubber being pressed down into the neck 14 around the core 20. When all of the cavities are filled, blowing compound is placed within each of the cups in one mold piece and the two mold pieces are put together and clamped, causing the edges of the cup-shaped pieces of rubber to engage each other at the parting line of the mold. The mold is now subjected to vulcanizing heat, the blowing compound giving off gas to expand the rubber against the walls of the cavities 12 and 13. When vulcanization is completed the two mold pieces 10 and 11 are separated, leaving the molded balls in the cavities 13. The operator then inserts a screw-driver into each of the slots 21 in turn and rotates the screw-driver to back off the threads of the core from the threads molded in the ball, thus disconnecting the balls from the cores and at the same time lifting the balls and dislodging them from the cavities 13. When the balls are all free of the cores 20 they may be removed, and the mold is then ready for a new charge, the core pins being maintained continuously in place.

Figure 2:
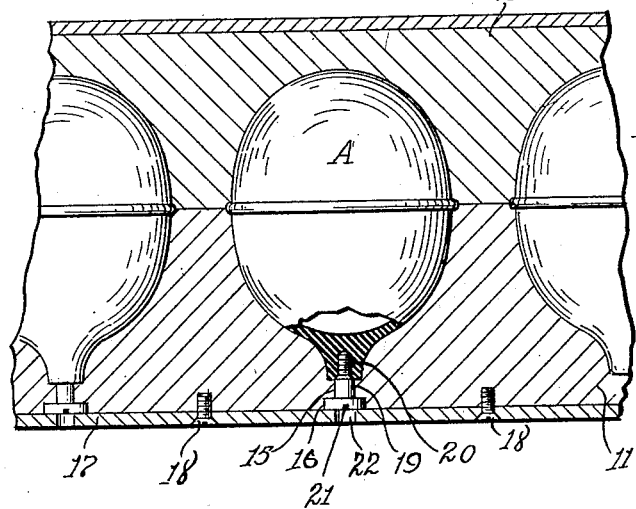
Fig. 2 is a similar view showing molded balls in place in the mold cavity.
Figure 3:
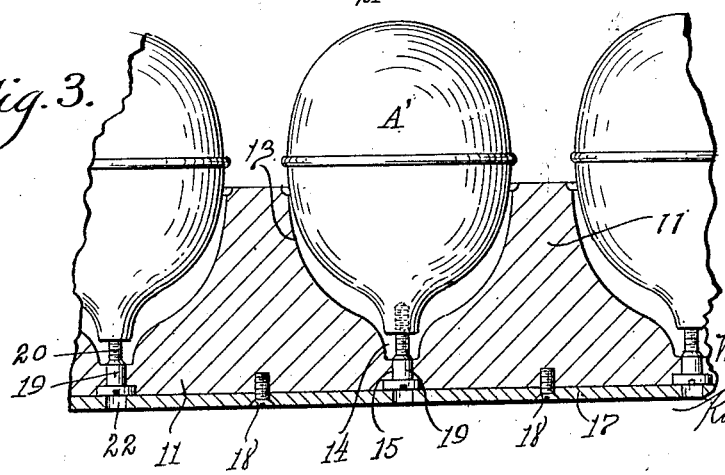
Fig. 3 is a sectional view of the mold piece in which the core pins are mounted, the latter having been rotated in a direction to disconnect them from the finished balls and dislodge the latter from the mold piece.

Molded float balls are shown in place in a closed mold at A in Fig. 2, while in Fig. 3 the balls are shown at A' in the position which they take after the pins 19 have been rotated to disconnect the cores from the balls.

The apparatus and method constituting my invention have been herein described by reference to float balls, but it is obvious that the invention is of more or less general application, particularly in connection with non-metallic articles. Furthermore, for the sake of fully illustrating the invention, I have described the apparatus and the method more or less in detail, but such detailed disclosure is not intended to constitute a limitation upon the scope of the invention.

Having thus described my invention, what I claim is:

1. In a permanent mold, a mold piece having a molding cavity therein, a pin rotatably mounted in said mold piece, said pin having a threaded portion extending into the said cavity and adapted to threadably engage with a socket in the molded article, and means for preventing longitudinal movement of said pin during the rotation thereof, whereby the unscrewing of the pin will dislodge the molded article from said mold piece.

2. In a permanent mold, a mold piece having a molding cavity therein, a pin rotatably mounted in said mold piece, said pin having a threaded portion extending into said cavity to form a core for the production of a threaded socket in the molded article, means for preventing longitudinal movement of said pin and means for rotating the same, whereby the unscrewing of the pin will dislodge the molded article from said mold piece.

3. In a permanent mold, a mold piece having a molding cavity therein, a pin rotatably mounted in said mold piece, said pin having a threaded portion extending into said cavity to form a core for the production of a threaded socket in the molded article, and having also a head seated in a counterbore in the mold piece, a cover plate for the said mold piece having an opening therein in alignment with said counterbore but of smaller diameter than the counterbore, and means in said head adapted to cooperate with a tool extended through said opening for turning said pin, whereby the unscrewing of the pin will dislodge the molded article from said mold piece.

4. In a permanent mold, a mold piece having a plurality of molding cavities therein, pins rotatably mounted in said mold piece, each of said pins having a threaded portion extending into one of said cavities to form cores for the formation of threaded sockets in the molded articles, each of said pins also having a head seated in a counterbore in the mold piece, a cover plate secured to the external side of said mold piece having openings therein in alignment with the said counterbore but of smaller diameter, and means in each of said heads adapted to cooperate with a tool projected through the corresponding opening for turning the corresponding pin, whereby the unscrewing of the pins will dislodge the molded articles from said mold piece.

5. In a permanent mold for the production of molded float balls with threaded sockets, a mold piece having a molding cavity therein, a pin rotatably mounted in said mold piece, said pin having a threaded portion extending into said cavity to form a core for the formation of a threaded socket in the ball, means permitting the rotation of said pin from the outer side of said mold piece, and means for preventing the longitudinal movement of the pin, whereby the pin serves not only as a core but also as a means for dislodging the molded ball from said cavity.

In testimony whereof, I hereunto affix my signature.

MILTON H. MARTINDELL.